(12) United States Patent
Lagally et al.

(10) Patent No.: US 12,102,101 B2
(45) Date of Patent: *Oct. 1, 2024

(54) FOODSTUFF HYDRATION AND PROCESSING SYSTEM

(71) Applicant: Seattle Food Tech, Inc., Seattle, WA (US)

(72) Inventors: Christie Lagally, Seattle, WA (US); Julia O'Donnell, Seattle, WA (US); Chloe Grubb, Seattle, WA (US); Jeffray Behr, Burlington, CA (US)

(73) Assignee: Seattle Food Tech, Inc., Seattle, WA (US)

( * ) Notice: Subject to any disclaimer, the term of this patent is extended or adjusted under 35 U.S.C. 154(b) by 219 days.

This patent is subject to a terminal disclaimer.

(21) Appl. No.: 17/880,929

(22) Filed: Aug. 4, 2022

(65) Prior Publication Data

US 2022/0369668 A1 Nov. 24, 2022

Related U.S. Application Data

(63) Continuation of application No. 17/518,499, filed on Nov. 3, 2021, now Pat. No. 11,432,565.

(Continued)

(51) Int. Cl.
  *A23J 3/26* (2006.01)
  *A23J 3/14* (2006.01)
  *A23J 3/22* (2006.01)

(52) U.S. Cl.
  CPC . *A23J 3/26* (2013.01); *A23J 3/14* (2013.01); *A23J 3/227* (2013.01)

(58) Field of Classification Search
  CPC ................. A23J 3/26; A23J 3/14; A23J 3/227

(Continued)

(56) References Cited

U.S. PATENT DOCUMENTS 3,558,324 A   1/1971   Page et al.
4,352,567 A  10/1982   Guibert (Continued)

FOREIGN PATENT DOCUMENTS

WO   2012021936 A1   2/2012

OTHER PUBLICATIONS

International Search Report and Written Opinion of the International Search Authority in International Application No. PCT/US2021/057950, mailed Jun. 30, 2022.

(Continued)

*Primary Examiner* — Hamid R Badr
(74) *Attorney, Agent, or Firm* — Cognition IP, P.C.; Edward Steakley; Justin White

(57) ABSTRACT

A system configured to hydrate and process foodstuff materials can include an exterior tube, an inner shaft, and multiple water inlets. The exterior tube can have a foodstuff inlet, an outlet, and a longitudinal axis, and can facilitate the conveyance of foodstuff materials along a material passage from the foodstuff inlet to the outlet. The inner shaft can be located within the exterior tube, can extend along the longitudinal axis, and can combine with the exterior tube to define the material passage. The inner shaft can be configured to be rotationally driven and can include one or more particle resizing features extending therefrom. The multiple water inlets can be spaced apart along the length of the material passage and can be configured to provide water to the foodstuff materials at different locations along the length of the material passage as the foodstuff materials are being conveyed along the material passage.

20 Claims, 7 Drawing Sheets

Related U.S. Application Data

(60) Provisional application No. 63/130,369, filed on Dec. 23, 2020.

(58) Field of Classification Search
USPC .......................................................... 426/516
See application file for complete search history.

(56) References Cited

U.S. PATENT DOCUMENTS

| | | |
|---|---|---|
| 4,473,299 A | 9/1984 | Guibert |
| 5,634,715 A | 6/1997 | Stehr et al. |
| 6,635,301 B1 | 10/2003 | Howsam |
| 2004/0057332 A1 | 3/2004 | Taniguchi |
| 2005/0219938 A1 | 10/2005 | Rigaudon et al. |
| 2006/0175723 A1 | 8/2006 | Butler et al. |
| 2007/0128322 A1 | 6/2007 | Haapiainen et al. |
| 2008/0118607 A1 | 5/2008 | Sandoval et al. |
| 2009/0155448 A1 | 6/2009 | Solorio et al. |
| 2010/0129506 A1 | 5/2010 | Cabrales et al. |
| 2010/0130627 A1 | 5/2010 | Casalini et al. |
| 2014/0010920 A1 | 1/2014 | Nishimura et al. |
| 2018/0243701 A1 | 8/2018 | Oba et al. |
| 2019/0150476 A1* | 5/2019 | Kurnia ................. A23K 20/147 |

OTHER PUBLICATIONS

International Search Report and Written Opinion of the International Search Authority in International Application No. PCT/US2021/057962, mailed Jun. 30, 2022.

\* cited by examiner

FOODSTUFF HYDRATION AND PROCESSING SYSTEM

CROSS-REFERENCE TO RELATED APPLICATIONS

This application is a continuation of and claims priority to U.S. patent application Ser. No. 17/518,499, filed Nov. 3, 2021, which in turn claims priority to U.S. Provisional Patent Application No. 63/130,369, filed Dec. 23, 2020, both of which are hereby incorporated by reference in their entireties.

TECHNICAL FIELD

The present disclosure relates generally to food processing, and more particularly to devices and methods used in the formation and preparation of meat analogue products.

BACKGROUND

Plant-based meat production is a growing industry, and plant-based meat products are becoming increasingly popular due to the improving quality and appeal of these products. Within plant-based meat production and meat analogue production in general, proteins and starches typically can take either a texturized or powdered form. Soy, for example, commonly appears in the form of texturized soy protein (i.e., dried pieces formed during low-moisture extrusion) and protein isolate (i.e., a fine powder). Tumblers (i.e., tumbling marinators), bowl choppers, and globe mixers are used traditionally within meat production in general, for tenderizing meat among other tasks. Within plant-based meat production, the same equipment is used in batch form to incorporate water into texturized or powdered protein. Within this batch process, the proteins, water, and potentially seasoning are constantly mixed, such that the water is either partially or fully dispersed and distributed to all of the protein pieces evenly and the water absorption speed increases. In some cases, the protein may then be moved out of the tumbler, bowl chopper, or globe mixer to be post-processed (e.g., using shredding, shearing, fracturing, metered expulsion, and/or other suitable post-processing techniques) at an intermediate or later stage after this mixing and water absorption, typically in another batch process.

Unfortunately, a number of problems arise when post-processing is done at a later stage (i.e., after hydration). This is because hydrating texturized protein changes the nature of that protein, such that the protein can become harder to process as water is increasingly absorbed into it. This is due to the physics of the water absorption, as texturized protein typically swells and becomes springier and more elastic while hydrating. Furthermore, the rate of water absorption is a function of water concentration as well as a number of other variables, including temperature (i.e., availability or mobility), the surface area of the protein, hydrophilic and hydrophobic material properties, and the textured vegetable protein cell structure (i.e., open or closed cell structure). These properties are neither controlled nor optimized by post-processing in a tumbler.

The consequence of either incomplete or overly lengthy hydration results in quality control issues, post-processing challenges, and higher costs of production. First, incomplete hydration can cause the protein material to draw water out of other parts of the product. As a result of incomplete hydration of the textured vegetable protein ("TVP" or "texturized protein"), pieces of the TVP enter the final mixture as partly dry protein. These dry parts of the TVP compete for water added later (or separately) in the process, and/or compete with other hydrated or water-binding ingredients for water. This may lead to inhomogeneity and/or a general decrease in juiciness within the final product. Second, when approaching full hydration, TVP becomes elastic and springy, and thus it requires more time and energy to post-process the material when fully hydrated. Third, both under-hydration and the springiness of highly-hydrated texturized protein can lead to inconsistency in particle size in post processing, which causes inconsistent quality in the finished goods product.

Tumblers, bowl choppers, and globe mixers also exhibit a number of limitations to usability for plant-based meat production and meat analogue production. Such equipment is typically used for batch hydration to better control for the large variability in meat products. While some of this equipment has been modified to interface with continuous production lines, this approach has been avoided for texturized protein hydration, because the liquid content and hydration times are too high—for example, the simple method of angling a tumbler to progress material through gravitational force is not technically feasible for material that takes 10 minutes or more to absorb at least its dry weight in water. However, for batch processing, this equipment requires manual heavy material transfer to convey to the next stage of production, and energy is wasted in this transfer. The heavy material transfer also leads to an increased risk to workers, particularly due to back and arm injury issues caused by the loading and unloading of this equipment.

Thus, there is a need in the field of food processing to create new and useful systems and methods for the hydration and post-processing of plant-based protein. The source of the problem, as discovered by the inventors, is a lack of progressive, continuous hydration and integrated post-processing to produce the desired water content, structure, and particle size consistency for meat analogues; and to avoid the other problems that result from both under-hydrating and over-hydrating prior to post-processing.

SUMMARY

It is an advantage of the present disclosure to provide improved systems and methods for post-processing and hydrating material such as proteins and starches, e.g., textured vegetable proteins ("TVP") for a plant-based meat product. The disclosed features, apparatuses, systems, and methods provide improved structure, consistency, and taste of meat analogue products based on continuously and progressively hydrating protein or other material while concurrently post-processing the material as it is being conveyed.

In some embodiments, these advantages can be accomplished at least in part by providing material such as TVP to be conveyed through a material passage between a pair of nested cylinders, where the inner cylinder or shaft oscillates rotationally to agitate and convey the material. In some embodiments, the material is then processed via a series of particle resizing features extending along the material passage. Such particle resizing features may be, e.g., blades, blunt-shaped teeth, screw threads, flutes, or similar protrusions extending from the inner cylinder or shaft. While the material is conveyed through the material passage, the particle resizing features can process, e.g., shred, shear, and/or chop the material into smaller material particles. At the same time, water is metered into the material passage while post-processing continues, resulting in the material particles being continuously and progressively hydrated during the post-processing step. In some embodiments, the end result is a more fibrous material which more closely resembles the texture and taste of meat than previous solutions could provide, with a more consistent size for each material particle leading to more uniform results.

In some embodiments, material such as texturized protein is conveyed through a stationary exterior tube with a rotating inner shaft, which holds one or more progression features (such as, e.g., an auger). In some embodiments, one or more bodies for shear crushing may additionally be present. In various embodiments, the shear crushing bodies may be offset cams, solid or sectioned spheroids, ribbed beaters, or any other suitable bodies for shear crushing. In some embodiments, material may be crushed and/or sheared between the flutes of the conveying auger and one or more additional surfaces. These shear crushing surfaces may comprise flutes of a partial or full shearing auger, or stationary protrusions such as fins from the exterior tube into the material passage. In some embodiments, water is concurrently added via one or more hydration ports which are configured to provide a metered flow rate of incoming water.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed methods and apparatuses for progressive hydration. These drawings in no way limit any changes in form and detail that may be made to the disclosure by one skilled in the art without departing from the spirit and scope of the disclosure.

DETAILED DESCRIPTION

Figure 1A:
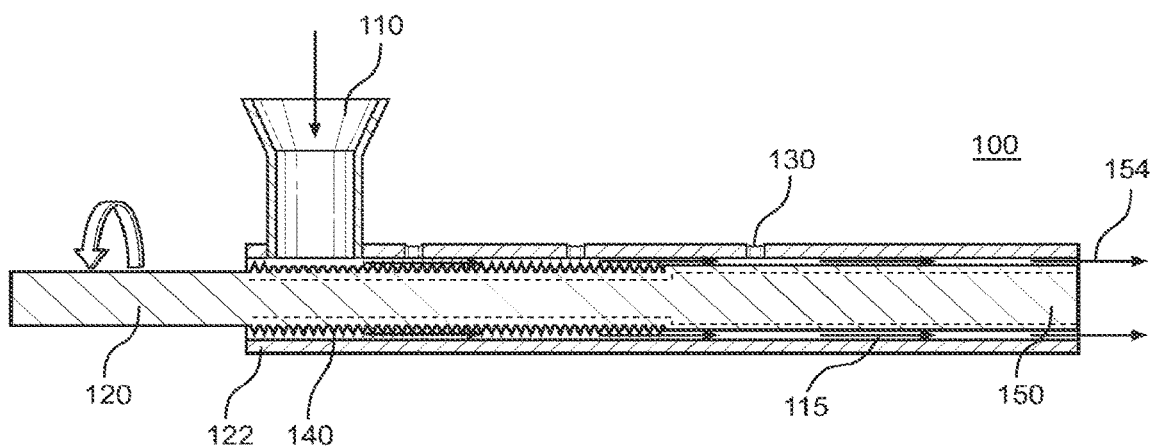
FIG. 1A illustrates a side cross-section view of an example progressive hydration system according to one embodiment of the present disclosure.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods for the progressive hydration, dispersal, and possible post processing of foodstuffs, such as plant-based proteins and starches. The disclosed embodiments can be used for post-processing and hydrating various materials including starches and proteins, such as, for example, textured soy protein within a plant-based meat product (e.g., a "veggie burger" or similar vegetarian or vegan foodstuff which does not contain meat in its ingredients). In one particular embodiment, the disclosed embodiments can utilize a progressive hydration system to efficiently shred texturized plant-based proteins and concurrently hydrate them continuously, so that the dry protein becomes increasingly hydrated over the length of the machine, and the concurrent post-processing results in faster and easier shredding, more consistent sizes, and improved taste and texture.

In some embodiments, the system is a progressive hydration and post-processing machine, where the post-processing may include one or more steps such as, e.g., shredding, shearing, fracturing, and/or metered expulsion of a plant-based textured protein for use in a plant-based meat product. In various embodiments, the machine can be a water-metered, continuous post-processing tool which solves the issues of texturized protein hydration and shearing to produce a desired structure of the protein (e.g., form it into a specific shape, density, and texture which consumers may expect or find desirable in a particular plant-based meat product), and which corrects particle size inconsistency caused by existing methods of post-processing textured vegetable protein for plant-based meat products. In other embodiments, the machine can be a water-metered, continuous progressive hydration machine, where material such as, e.g., textured vegetable protein may be consistently, accurately, and uniformly hydrated, while being continuously conveyed.

A primary issue of making plant-based meat is that the use of textured vegetable proteins in plant-based meat recipes requires timely and complete hydration of the material, and possible further post-processing of the material to bring it to desired particle sizes and shapes. Incomplete hydration, as a result of poor water migration to the center of larger pieces of TVP, can cause this material to draw water out of other parts of the product, while complete hydration can make it difficult to process (e.g., chop, shred, and/or shear) the protein in a controlled fashion due to the springy material properties at this stage. The solution proposed herein involves performing both the hydration and post-processing steps simultaneously so that as particle sizes are decreased, water is added gradually, making it possible to both control particle size at a stage of under-hydrated protein, and allowing for faster full hydration as water is added after the material is post-processed into smaller pieces. Furthermore, this solution allows for the continuous shredding of material, which results in a more desired fibrous structure rather than fractured particles, while also maintaining material flow.

In some embodiments, the system is designed such that dry or partially-hydrated TVP enters a material passage between an exterior tube and a rotating, large-diameter, potentially hollow inner shaft via an inlet. At this point, in various embodiments, the TVP is fractured, sliced, and/or sheared by a set of particle resizing features (e.g., blades, flutes, or blunt-impact teeth) along the material passage to bring down the size to, for example, approximately ½ cm, and water is immediately dispensed in a metered fashion to the TVP in the material passage. As the TVP wets, it continues to be fractured, sliced, and/or sheared as it progresses (i.e., is conveyed) down the inner shaft. As new surface areas of the TVP particles are exposed, more water is added to immediately wet the exposed dry surfaces of the TVP. Once the TVP has conveyed through the chamber, the TVP has been both precisely processed and precisely hydrated, and with less time than hydration would have taken if a tumbler-based batch hydration method or similar water migration method had been used.

Figure 3:
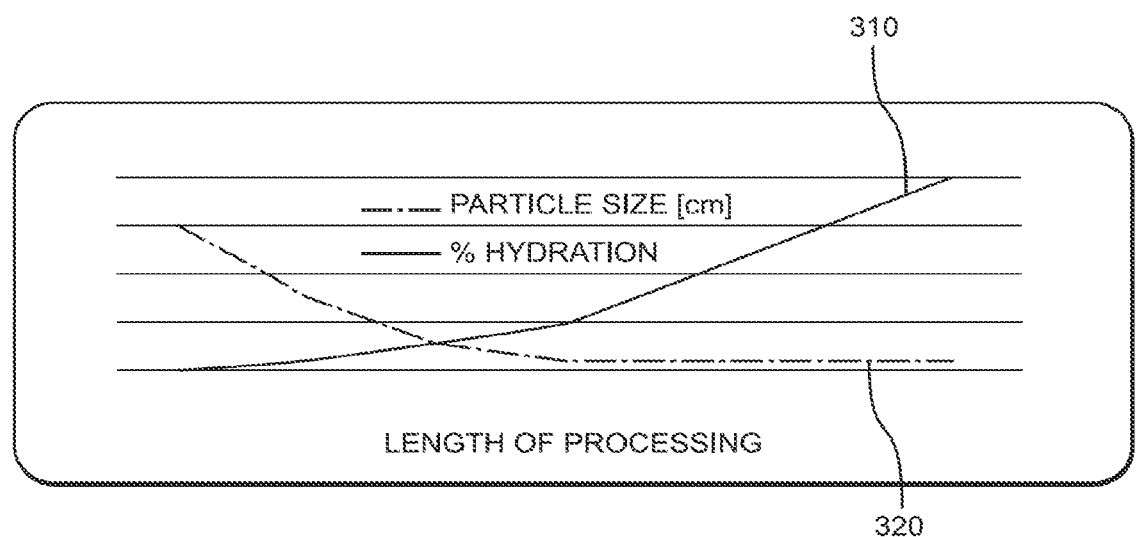
FIG. 3 illustrates a graph depicting the relationship between particle size and percentage of hydration within one embodiment of the present disclosure.

One potential example of this performance within the present solution can be seen in the graph illustrated in FIG. 3. The graph depicts the progression of controlled TVP size reduction and surface or particle wetting. The graph shows a percentage of hydration line 310, where the percentage of hydration increases from 0% to 100% over the length of the post-processing of the protein. The graph also shows a particle size line 320, which, for example, could decrease from 1.5 cm to less than 0.25 cm over the length of the post-processing of the protein. FIG. 3 depicts a representative example relationship between the particle size and the percentage of hydration. Specifically, TVP of constant size has been shown to typically hydrate in an approximately logarithmic fashion, where initially water is absorbed quickly, but the rate of absorption rapidly decreases as the TVP nears saturation. However, if the TVP is concurrently processed to decrease particle size during hydration, due to the surface area and the properties of water migration, the rate of hydration is increased. Thus, progressively hydrating protein while post-processing to decrease particle size can be a faster and more efficient process with the desirable outcomes described above.

In addition to the progressive particle size decrease, the present solution may present an opportunity to optimize for TVP particle shape. The various embodiments of the present machine provide for the opportunity to scission partially hydrated protein at weak points in the textured protein to obtain desired shape or structure from a particular type of TVP. Fractal fibrous structure—i.e., a structure in which bundles of fibers are themselves compartmentalized and lined up into larger bundles of fibers—is desired in many meat-like foods, as it mirrors the microstructure of animal skeletal muscle. TVP manufactured by extrusion already exhibits some anisotropic fiber orientation, and applying shear to TVP has been shown to tear the TVP pieces along these fiber lines, resulting in such fractal fibrous structure. Shear may be applied in a number of ways to achieve this result. In some embodiments, multiple particle resizing features may be combined, for example, a section of blunt-impact teeth may be added after a section of slicing blades. In some embodiments, a section of shear crushing spheroids may be added after or between sections of a mixing auger to provide shear to material such as TVP by crushing the TVP against the outer cylinder's walls. In some embodiments, a section of ribbed beaters may be added after or between sections of the mixing auger to similarly shear the TVP. In some embodiments, a section of cams may be added after or between sections of the mixing auger to similarly shear the TVP. In other embodiments, a full or partial shearing auger may be added intermittently alongside the mixing auger, such that the progressive mixing auger crushes and shears the TVP against these (stationary or concurrently rotating) flutes. In still further embodiments, stationary protrusions from the exterior tube provide the surfaces against which the mixing auger shears the protein.

The present solution also has the benefit of a built-in conveyance, such that raw material TVP can be directly delivered to the post-processing features, and concurrently the material can be continuously and progressively hydrated, and the material may be continuously expelled to avoid manual batch transfer. Further, in some embodiments the inner shaft and its particle resizing features can be designed to rotate at low speeds, which can help to alleviate metal fracture and safety concerns, and also to limit heat generation. Further, in some embodiments, chilled water and/or chilled materials can be used in the tool to offset heat generation, and due to the high surface area to volume ratio of the material passage, an actively cooled insulated jacket would be especially effective to cool the material during post-processing. Additionally, because the present solution focuses on the first principles of the relationship between hydration and post-processing to use energy precisely when the material is ready for post-processing, the present solution can be optimized to minimize required energy input.

Although various embodiments disclosed herein discuss progressive hydration and post-processing of TVP and other plant-based proteins intended to be used in plant-based meat production, it will be readily appreciated that the disclosed features, apparatuses, systems, and methods can similarly be used for any relevant hydration and post-processing of materials. For example, the disclosed progressive hydration and post-processing system may also be used with plant-based proteins in powdered or other forms other than texturized form, or potentially with some meat-based proteins, or starches or other polysaccharides. In some situations, the disclosed progressive hydration and post-processing system can also be used to hydrate and process materials that are not foodstuff-based. Other applications, arrangements, and extrapolations beyond the illustrated embodiments are also contemplated.

Referring to FIG. 1A, a side cross-section view of an example progressive hydration and post-processing system 100 is illustrated according to one embodiment of the present disclosure. The progressive hydration and post-processing system 100 can be, for example, one portion or component of a larger system, e.g., it may be a single component in a series of components within a food production process. In this embodiment, the progressive hydration and post-processing system 100 consists of an inlet 110, inner shaft 120, an exterior tube 122, one or more metered inlets 130, one or more particle resizing features (e.g., blades or teeth) 140, and one or more conveyance components 150 which facilitate conveyance away from the input inlet (conveyance components 150 are not pictured in FIG. 1A, but are illustrated in FIG. 1C as described below with respect to the small auger flutes 180). In some embodiments, the conveyance components 150 direct the material towards another component located at the output 154 of the system 100. In some embodiments, the separate inlet 110 and metered inlets 130 are presented as a single set of one or more inlets that share functionality.

The inlet 110 is configured to provide a means for material (e.g., protein or starches) to be brought into the system 100, specifically into material passage 115 between the inner shaft 120 and the exterior tube 122. In some embodiments, the inlet buffers doses of the material in stages or continuously. In some embodiments, the inlet 110 is a funnel which vertically feeds material into the material passage 115. In some embodiments, the inlet may instead have a horizontal design, and/or may not make use of a funnel. In some other embodiments, the entire system 100 may be vertical in nature, or may be tilted at an angle to facilitate material flow.

The inner shaft 120 is configured to rotate about its long axis. In varying embodiments, the inner shaft 120 may be large in diameter, as illustrated in FIG. 1, or small in diameter, as illustrated in FIGS. 4-6. In varying embodiments, the inner shaft 120 may be hollow, as illustrated in FIG. 1, or solid, as illustrated in FIGS. 4-6. In some embodiments, the inner shaft rotates in a manner and direction such that surface features which promote conveyance 150 are engaged to convey material towards the output 154. In some embodiments, the inner shaft 120 rotates around an axle, rotational shaft, or other rotational component of the system. In some embodiments, as material enters the material passage 115 via the inlet 110, the material is conveyed toward the output 154 (as depicted by the right arrows in the figure). In some embodiments, the material tumbles along in a turbulent material flow as the inner shaft 120 rotates.

In some embodiments, the inner shaft 120 is configured for oscillatory progressive rotation, such as, e.g., two full rotations clockwise followed by one half rotation counterclockwise. In some embodiments, the inner shaft 120 is configured to rotate at a predefined speed measured in rotations per minute (RPM) to provide just-in-time hydration of the material, coupled with the metered flow rate of water from ports 130, to provide a precise application of water to hydrate the material to a specified level before, during, and after post-processing. For example, the inner shaft 120 may be configured to rotate at a relatively slow 50-70 RPM, as slower rotation allows for slicing while hydrating. Conversely, some embodiments may be configured for a higher RPM to complete the hydration process and/or particle resizing faster. Some embodiments may be configured for intermittent "pulse" rotation, where the inner shaft may rotate in regular short bursts of fast rotation alternating with slow rotation or a stationary hold. Still other embodiments may include a combination of the above controls, optimized to process a particular material. The controls may be variable, such that a preferred control sequence may be selected from a predefined set of motion profiles, each tuned to best process a particular material. In some embodiments, the metered flow rate of water may be similarly variably controlled, and may be linked to the motion profile of the inner shaft. Providing a predefined inner shaft rotation control sequence and metered flow rate of water can precisely post-process and hydrate the material, in a manner which dramatically reduces hydration time and ensures just-in-time hydration at a rate optimal to minimize the energy required for post-processing, while maintaining the precise hydration ratio required in food production.

The short residence time of the material (e.g., a protein such as TVP) in the machine allows for easy start-up and shut-down of production (due to, e.g., no pre-soaking of the material required), and better control of material usage for just-in-time "Lean" production methods, which have been known for decades to save costs, material waste, and energy in manufacturing systems. The shortened residence time of the material in the machine also may decrease the risk of food-borne bacterial growth. Additionally, unlike post-processing material in, e.g., a bowl chopper, which often results in significant waste due to material spraying out or escaping the open bowl during chopping, the present solution fully contains the material to ensure nearly zero waste during post-processing.

In some embodiments, metered inlets 130 are configured to provide water for precisely hydrating the material as it is conveyed along the inner shaft. The water may be metered according to any number of methods. In some embodiments, the water is metered according to a predefined hydration curve (e.g., hydration as a function of one or more of particle size, amount of post-processing, time, and/or position). Such a curve may be, for example, similar to the percentage of hydration line depicted in FIG. 3, as discussed above. The hydration curve may be linked to the predefined rotation control sequence of inner shaft 120, as discussed above. Any other suitable hydration curve may be used. Matching the water metering to the curve can provide accurate, consistent, and fine-tuned results, as may be necessary and/or desired to maintain or improve the quality of certain plant-based meat, meat analogues, or other food products.

One or more particle resizing features 140 are present along the inner shaft. The particle resizing features protrude from the inner shaft and function to process the material. In various embodiments, particle resizing features can include one or more of, e.g., blades, blunt teeth, screw threads, and/or flutes.

In various embodiments, the post-processing may include one or more of the following: shredding, shearing, fracturing (e.g., initially fracturing in order to homogeneously decrease particle size), and/or metered expulsion. In various embodiments, the post-processing may additionally or alternatively include one or more of the following: chopping, extruding (e.g., dispersion of water for powdered material, such as an auger pushing through a die), crushing, grinding, breaking, slicing, homogeneously processing, inhomogeneously processing, pulverizing, homogeneously mixing, tearing, scission, mincing, pulling, macerating, smearing, and/or otherwise performing operations on the material in some way to facilitate uniform hydration and/or to reduce the size of the material particles being conveyed along the inner shaft. In some embodiments, post-processing may instead or additionally include uniformly disseminating water, or enhancing the mobility of water through the material for full dissemination. In some embodiments, the particle resizing features 140 are configured to shred the material along fibrous striations, as the material is being rotated in the chamber, such that one or more fibers of the material are pulled apart. In some embodiments, the small fibers are left intact as a result of this shredding. In some embodiments, the particle resizing features function to chop larger pieces of the material (such as, e.g., nominally 1 cm² flakes of textured vegetable protein) to a desired specific size or size range. In some embodiments, the particle resizing features may be ceramic or another suitable material for chopping or performing other post-processing steps. In some embodiments, the particle resizing features are solid extrusions which are formed around a rotating inner shaft. In some embodiments, the particle resizing features may be interchangeable, such as, e.g., through fixed attachment to a spline which may be removed from the inner shaft 120. The particle resizing features could thus be swapped out for different particle resizing features (e.g., swapping out blades for blunt-impact teeth) without necessitating, for example, replacement of the entire shaft.

The conveyance 150 is configured to convey the material to the system output 154 towards a next component of a larger system after the post-processing and progressive hydration of the material are completed. In some embodiments, the material is conveyed to the input of a next machine for one or more food production tasks, such as, e.g., typical plant-based meat mix and form methods of production. In some embodiments, the material moves toward an auger mixer to be mixed with other components of the food product. In some embodiments, the material flow out of output 154 may be automatically regulated through adjustable mechanical or electromechanical means (e.g., an additional screw auger and a weight-based dispenser for precise material transfer, or other suitable means). In some embodiments, the material flow out of output 154 may be regulated through integration with the rotation controls of the inner shaft 120. In some embodiments, prior to the material being conveyed towards a next component, seasoning or flavoring is mixed into the material (e.g., seasoned water, powdered flavor particles, or any other suitable seasoning or flavoring). Many other possibilities may be contemplated depending on context.

In some embodiments, in the event that cooling or tight temperature controls are desired, a chiller (such as, e.g., a jacket chiller) is used to maintain the temperature of ingredients and final dough throughout the various stages of the process. Such a chiller may be integrated with one or more components of the system at various stages of the process (e.g., integrated with an inlet, one or more funnels, or any other suitable component of the system). In some embodiments, an insulating jacket can be placed around the exterior tube 122. Alternatively, or in addition, an internal cooling flow can be circulated through the exterior tube 122 and/or inner shaft 120. Still further in some embodiments, the temperature of the input materials, such as TVP and water, can be suitably chilled prior to introducing these materials at either the inlet 110 or the metered inlets 130.

Figure 1B:
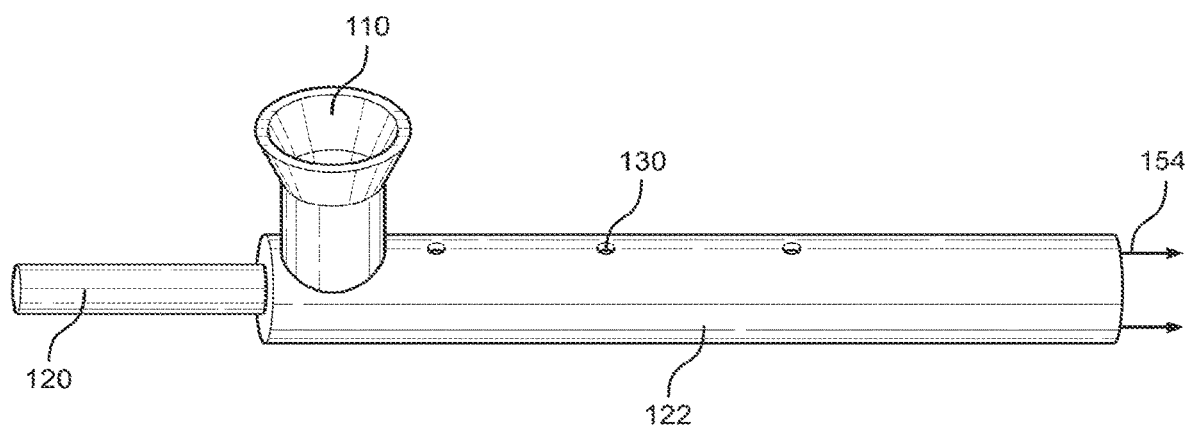
FIG. 1B illustrates a side top perspective view of an example progressive hydration system according to one embodiment of the present disclosure.
Figure 1C:
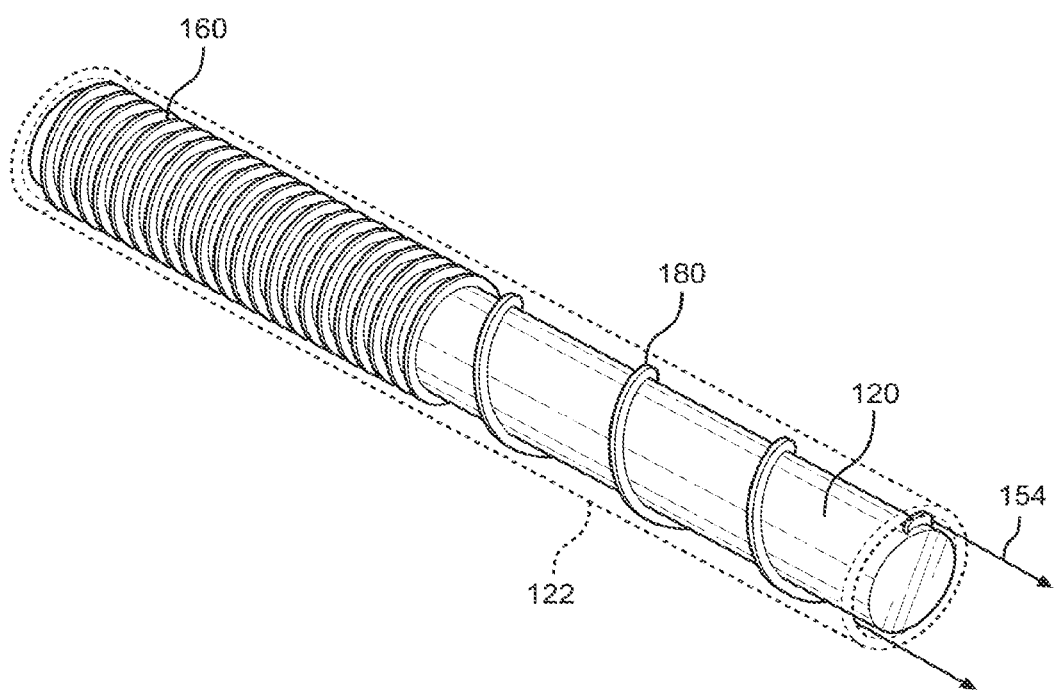
FIG. 1C illustrates a side top perspective view of the interior of an example progressive hydration system according to one embodiment of the present disclosure.

Turning next to FIG. 1B, a side top perspective view of an example progressive hydration system is illustrated according to one embodiment of the present disclosure. The inlet 110 as described above can be seen in a side top perspective view, as can the rotating inner shaft 120, the stationary exterior tube 122, and one or more metered inlets 130. In various differing embodiments, the inlets may vary in size and/or number.

FIG. 1C illustrates a side top perspective view of the interior of an example progressive hydration system, according to one embodiment of the present disclosure. Particle resizing features 160 are shown attached to an inner shaft 120 and within an exterior tube 122. Material is mixed and conveyed in a material passage (such as material passage 115 in FIG. 1A) between the inner shaft 120 and exterior tube 122. In some embodiments, one or more material progression features are present at or near the end of the inner shaft 120. In some embodiments, the diameter of the inner shaft is decreased, and one or more small auger flutes 180 are present. The small auger flutes 180 function to convey the material towards a next component or an output (such as output 154 as illustrated in FIG. 1A, 1B, or 1C).

The system includes one or more particle resizing features 160, as described above, as well as a means of conveying the material. In some embodiments, there may be a hydrating section, followed by a section with particle resizing features, followed by another hydrating section. Other such embodiments may be contemplated. The hydrating section functions to provide water which hydrates new surface areas of the material which are exposed during rotation of the inner shaft and/or particle resizing. In some embodiments, one or more grooves, ridges, or other fluid passage features can be formed along the outer surface of the inner shaft 120 in the hydration section, the inner surface of the exterior tube 122 in the hydration section, or both. Such grooves, ridges, and/or other surface features can direct viscous fluids (e.g., water) through the fluid passage, and also direct or convey the partially- or fully-hydrated material. In some embodiments, such surface features may also aid in post-processing material by applying intermittent force or generating turbulence as the material rotates through the material passage.

In some embodiments, the progressive hydration and post-processing system as shown can be configured to facilitate standard industrial food processing clean-in-place, such as through the addition of dedicated ports for pressurized cleaning fluid input and drainage. In various embodiments, the progressive hydration and post-processing system as shown can be readily disassembled or taken apart, such as for cleaning in an industrial dishwasher. Accordingly, in some embodiments, the exterior tube may be detached from the inner shaft, inlet, or other components. In some embodiments, the particle resizing features may be detached from the inner shaft, such as, e.g., the inner shaft can be detached from the blades or teeth. Other similar components may be decoupled, such that these components may also be removed and placed into an industrial dishwasher or other cleaning device.

In some embodiments, one or more components of the progressive hydration and post-processing system may be interchangeable with other identically or similarly shaped components. For identically shaped and sized components, this can serve to streamline production processes where one component is swapped in while another component is being cleaned or repaired. For distinct geometry components, additional geometries can serve to more efficiently process different materials, such as, e.g., different sizes or shapes of TVP, dried fungi or mushroom protein, or powdered proteins or starches.

Figure 2:
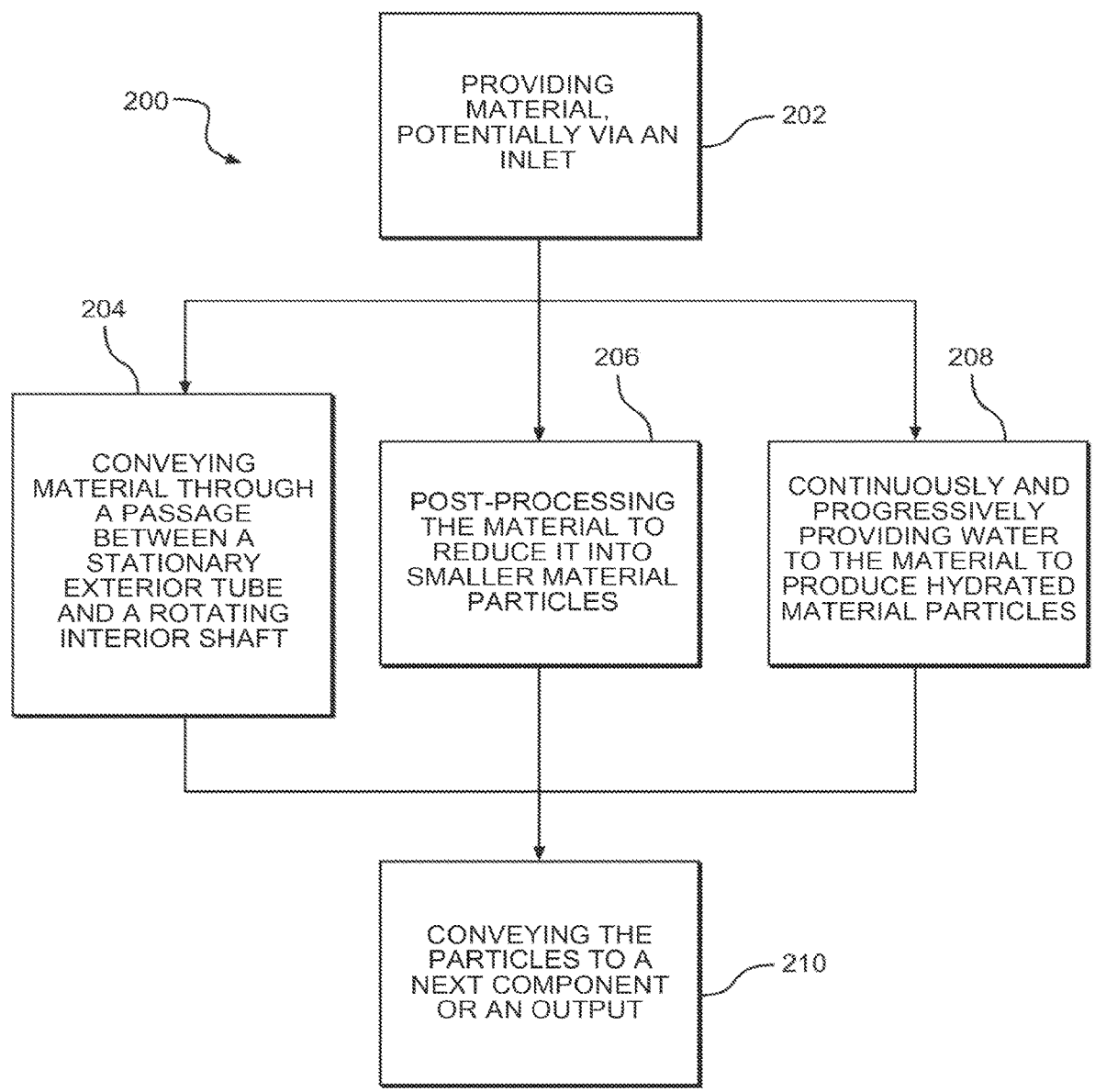
FIG. 2 illustrates a flowchart of an example method of post-processing and continuously and progressively hydrating material according to one embodiment of the present disclosure.

FIG. 2 provides a flow chart of an example method 200 for post-processing and continuously and progressively hydrating material according to one embodiment of the present disclosure. At step 202, the system provides material (e.g., via conveyance from other components) into a material passage (potentially via an inlet), as described above. Steps 204, 206, and 208 are all performed concurrently or in parallel to one another.

At step 204, the material is conveyed through a material passage between an exterior tube and a rotating inner shaft, as described above.

At step 206, concurrent to conveying the material through the material passage, the system processes the material to reduce it into smaller particles. This post-processing step is described in further detail above.

At step 208, concurrent to conveying the material and also concurrent to post-processing the material, the system continuously and progressively provides water to the material to produce hydrated material particles. The step of hydration is described in further detail above.

At step 210, the particles are conveyed to a next component or an output (such as output 154 as illustrated in FIG. 1A, 1B, or 1C). In some embodiments, the particle output is metered through mechanical or electro-mechanical means, such as through a loss-in-weight automated dosing system. In some embodiments, the particles are directly conveyed to other components which may, e.g., collect and precisely meter out the material; shear and/or further process the material; mix the material with other materials; or form the material into a burger patty, "chicken" nugget, or other suitable shape or form as desired. Additional components may fry, pack, package, and freeze the material. The end result may be a final product constituting a plant-based meat product, meat analogue product, or other suitable end product as desired.

Figure 4A:
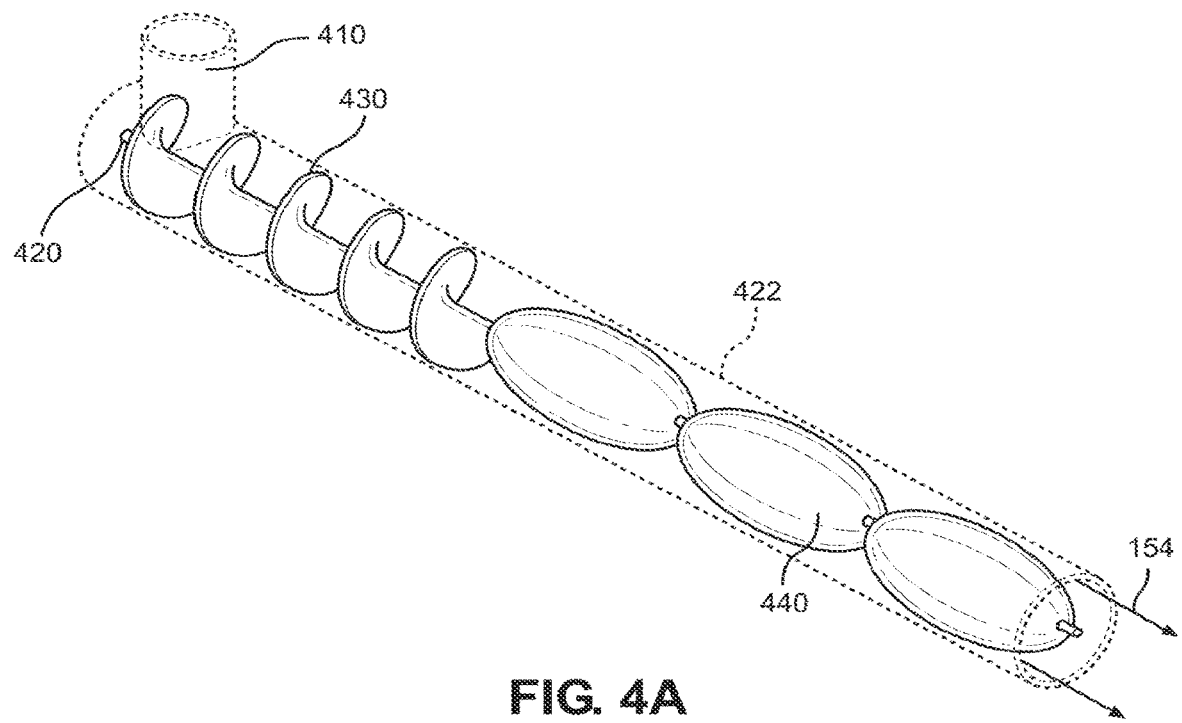
FIG. 4A illustrates a frontal top perspective view of the interior of an example progressive hydration system according to one embodiment of the present disclosure.

Turning now to FIG. 4A, a frontal top perspective view of the interior of an example progressive hydration system is illustrated according to one embodiment of the present disclosure. Within this alternative embodiment, a design for hydrating and shearing material is presented which utilizes an auger 430 and shear crushing spheroids 440.

An infeed 410 provides a location to add material, such as TVP, powdered protein, or starches. The material is conveyed to a material passage (such as material passage 115 in FIG. 1A) located inside a stationary exterior tube 422. An inner shaft 420 is located inside the exterior tube, and is configured to rotate. In some embodiments, the inner shaft 420 is attached via a drivetrain to a motor which enables it to rotate. The inner shaft 420 holds together an auger 430 and one or more shear crushing spheroids 440. The auger 430 rotates and pushes material forward in a turbulent manner. One or more hydration ports (not illustrated in FIG. 4A, but illustrated in FIG. 4B) are configured to add water at a metered flow rate, concurrently to the auger conveyance. The one or more shear crushing spheroids 440 provide shear to the material by crushing the material against the walls of exterior tube 422. In some embodiments, the spheroids 440 rotate along with the inner shaft 420. In some embodiments, the spheroids 440 may have cutouts to mitigate pressure buildup, and/or surface features to facilitate material flow for the material along the tube, such as, e.g., one or more protrusions or grooves which spiral along the spheroid's surface. In some embodiments, as the material reaches the end of the tube, it is actively or passively conveyed toward an output 154.

In some embodiments, some or all of the components of FIG. 4A are modular in nature to allow removing the components for disassembly and cleaning in an industrial dishwasher or other cleaning device, or to facilitate clean-in-place. For example, in some embodiments, a portion or all of the auger 430 may be removable from the inner shaft 420 and from one or more spheroids 440. In some embodiments, the inner shaft is fixed while the auger flutes and spheroids 440 are removable. In some embodiments, the entire spheroid portion of the tube, as well as the inner shaft 420 may be removable from the tube. In some embodiments, the modularity may enable a different design, such as, for example, a tube containing a linear combination of auger, spheroid, auger, spheroid, or any other suitable combination which may perform alternate methods of hydrating and/or post-processing the material.

Figure 4B:
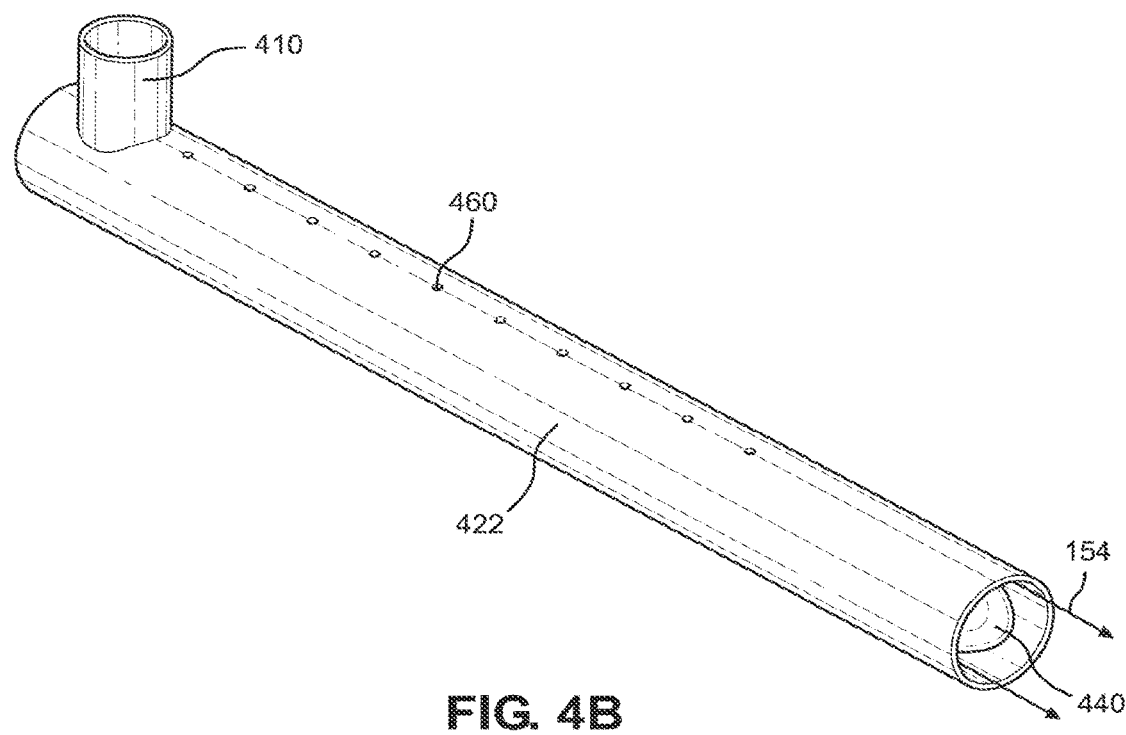
FIG. 4B illustrates a frontal top perspective exterior view of an example progressive hydration system according to one embodiment of the present disclosure.

FIG. 4B illustrates a frontal top perspective exterior view of an example progressive hydration system according to one embodiment of the present disclosure. The system as shown in FIG. 4B is an exterior view of the same system from FIG. 4A. The infeed 410 is shown from the exterior, as well as the exterior tube 422 and a visible portion of the shear crushing spheroids 440, which are located inside the tube. Also visible from the exterior are several hydration ports 460, which add water at a metered flow rate.

Figure 5A:
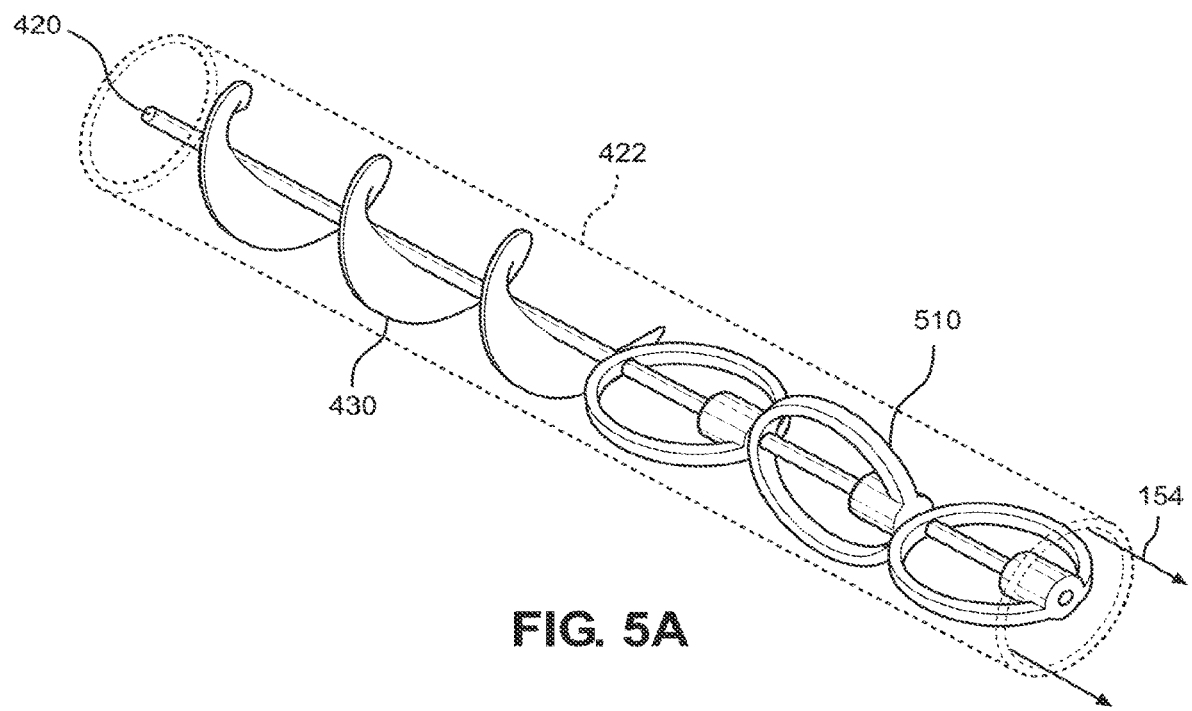
FIG. 5A illustrates a frontal top perspective view of the interior of an additional example progressive hydration system according to one embodiment of the present disclosure.

FIG. 5A illustrates a frontal top perspective view of the interior of an additional example progressive hydration system according to one embodiment of the present disclosure. The system as shown in FIG. 4A is largely present in this example, including an infeed 410, not pictured, which provides material (e.g., protein or starch); an inner shaft 420 which rotates; an exterior tube 422 which contains material; and an auger 430 which rotates and pushes the material forward. In place of the shear crushing spheroids of FIG. 4A, a different shear crushing component is included in the form of beaters 510. The material is pushed along by the auger 430 to be placed between the exterior tube 422 and the beaters 510. The beaters 510 provide shear to the material by crushing the material against the exterior tube walls, and rotate with the inner shaft 420. In some embodiments, the beaters 510 may have more than the two ribs depicted in FIG. 5A. In some embodiments, the beaters 510 may have supports which extend radially from the inner shaft to the ribs. In some embodiments, the beaters 510 may be angularly offset relative to other beaters, as shown. In some embodiments, the beaters 510 may be radially or bilaterally symmetrical with respect to inner shaft 420; in other embodiments, the beaters may be offset such that their rotation is asymmetrical with respect to the long axis of inner shaft 420.

In some embodiments, some or all of the components of FIG. 5A are modular in nature to allow removing the components for disassembly and cleaning in an industrial dishwasher or other cleaning device, or to facilitate clean-in-place. For example, in some embodiments, a portion of the auger 430 may be removed along with one or more of the beaters 510. In some embodiments, the auger flutes of the auger 430 may be removed along with one or more of the beaters 510. In some embodiments, the entire beater portion of the inner shaft and exterior tube may be removed. In some embodiments, the modularity may enable a different design, such as, for example, a tube containing a linear combination of auger, beater, auger, beater, or any other suitable combination which may perform alternate methods of hydrating and/or shearing the material.

Figure 5B:
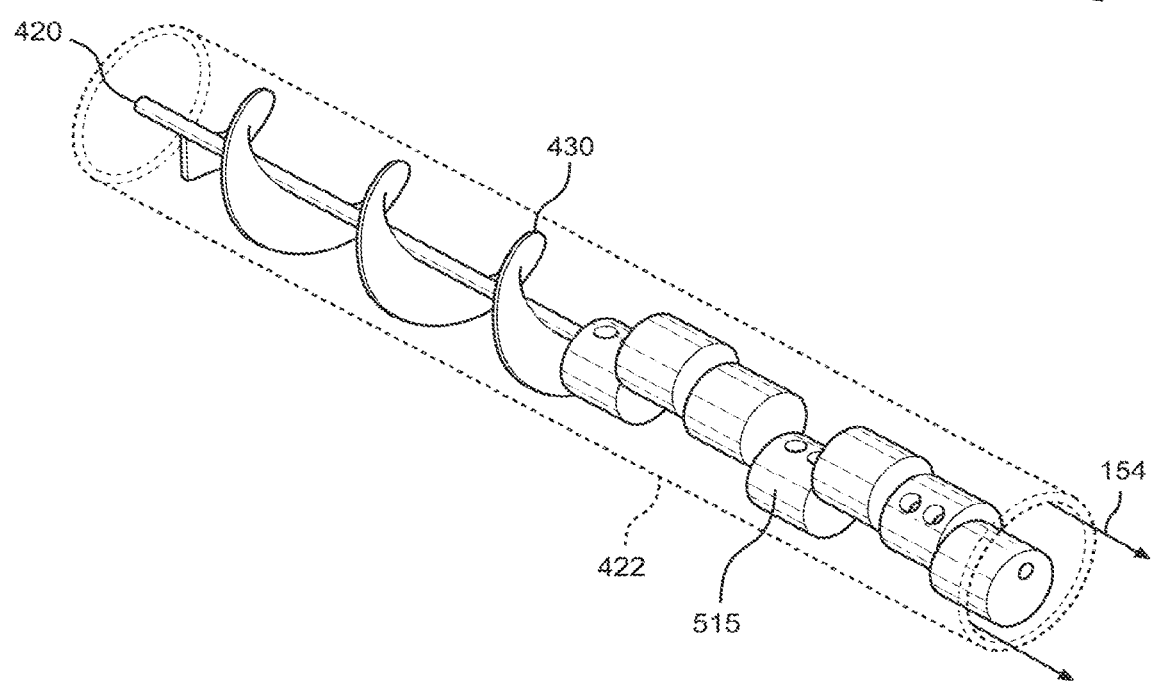
FIG. 5B illustrates a frontal top perspective view of the interior of an additional example progressive hydration system according to one embodiment of the present disclosure.

FIG. 5B illustrates a frontal top perspective view of a cross section of an additional example progressive hydration system according to one embodiment of the present disclosure. The system as shown in FIG. 4A is largely present in this example, including an infeed 410, not pictured, which provides material (e.g., protein or starch); an inner shaft 420 which rotates; an exterior tube 422 which contains material; and an auger 430 which rotates and pushes the material forward. In place of the shear crushing spheroids of FIG. 4A, a different shear crushing component is included in the form of shear crushing cams 515. The material is pushed along by the auger 430 to be placed between the exterior tube 422 and the shear crushing cams 515. The shear crushing cams 515 provide shear to the material by shearing and crushing the material between the cams and the exterior tube 422. The shear crushing cams 515 rotate with the inner shaft 420. In some embodiments, the shear crushing cams 515 may not be cylindrical; rather, they may appear as relatively smooth, non-circular outer contours. In some embodiments, the shear crushing cams 515 may be angularly offset relative to other cams, as shown. In various embodiments, the cams can be three-dimensional shapes, two-dimensional or nearly two-dimensional shapes, or any other suitable shapes for providing shear to the material.

In some embodiments, some or all of the components of FIG. 5B are modular in nature to allow removing the components for disassembly and cleaning in an industrial dishwasher or other cleaning device, or to facilitate clean-in-place. For example, in some embodiments, a portion of the auger 430 may be removed along with one or more of the shear crushing cams 515. In some embodiments, the auger flutes of the auger 430 may be removed along with one or more of the shear crushing cams 515. In some embodiments, the entire cam portion of the inner shaft and exterior tube may be removed. In some embodiments, the modularity may enable a different design, such as, for example, a tube containing a linear combination of auger, cam(s), auger, cam(s), or any other suitable combination which may perform alternate methods of hydrating and/or shearing the material.

Figure 6A:
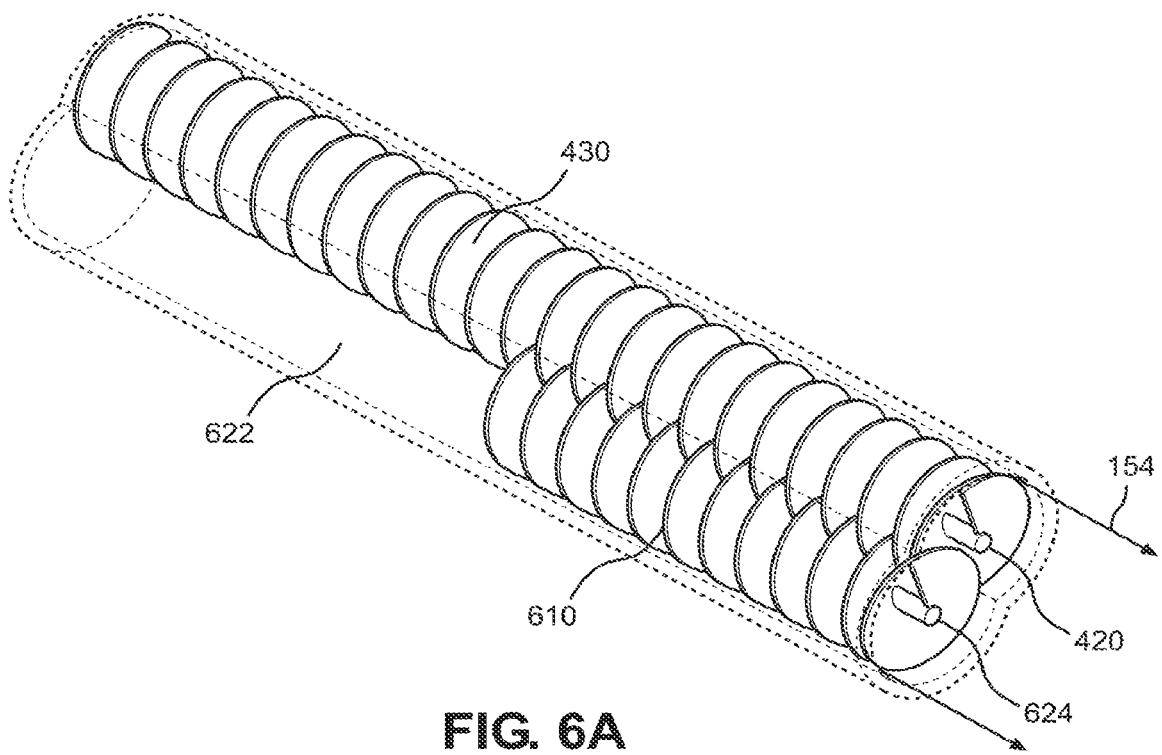
FIG. 6A illustrates a frontal top perspective view of the interior of an additional example progressive hydration system according to one embodiment of the present disclosure.

FIG. 6A illustrates a frontal top perspective view of a cross section of an additional example progressive hydration system according to one embodiment of the present disclosure. The system as shown in FIG. 4A is largely present in this example, including an infeed, not pictured, which provides material (e.g., protein or starch); an inner shaft 420 which rotates; and a mixing and conveying auger 430 which rotates and pushes the material forward. In place of the simple cylindrical exterior tube 422 to contain the material, the embodiment shown in FIG. 6A includes a semi-bifurcated exterior tube 622 which contains two overlapping augers. In place of the shear crushing spheroids of FIG. 4A, a different shear crushing component is included in the form of a shearing auger 610. The shearing auger 610 is enclosed within exterior tube 622, such that the flutes protrude into the spaces between the flutes of mixing and conveying auger 430. A second inner shaft 624 is located inside the semi-bifurcated exterior tube 622, parallel to the inner shaft 420, and is configured to rotate. The second inner shaft 624 holds together the shearing auger 610 and facilitates its rotation. In some embodiments, the shearing auger 610 and its shaft 624 rotates with or opposed to the inner shaft 420 and mixing and conveying auger 430. In some embodiments, the exterior tube 622 rotates such that the shearing auger 610 progresses around the mixing and conveying auger 430 in a planetary fashion. As the material is pushed along by the rotating auger 430, the shearing auger 610 functions by providing a surface for shearing and crushing the material between the flutes of the mixing/conveying auger 430 and the flutes of the shearing auger 610.

In some embodiments, some or all of the components of FIG. 6A are modular in nature to allow removing the components for disassembly and cleaning in an industrial dishwasher or other cleaning device, or to facilitate clean-in-place. For example, in some embodiments, all or a portion of the auger 430 and/or the shearing auger 610 may be removed. In some embodiments, the auger flutes of the auger 430 and/or the auger flutes of the shearing auger 610 may be removed. In some embodiments, the entire shearing auger 610 portion of the inner shaft and exterior tube may be removed. In some embodiments, the modularity may enable a different design, such as, for example, a tube containing intermittent sections of shearing auger flutes, of equal or differing lengths, spaced at even or uneven intervals; or any other suitable combination which may perform alternate methods of hydrating and/or shearing the material.

Figure 6B:
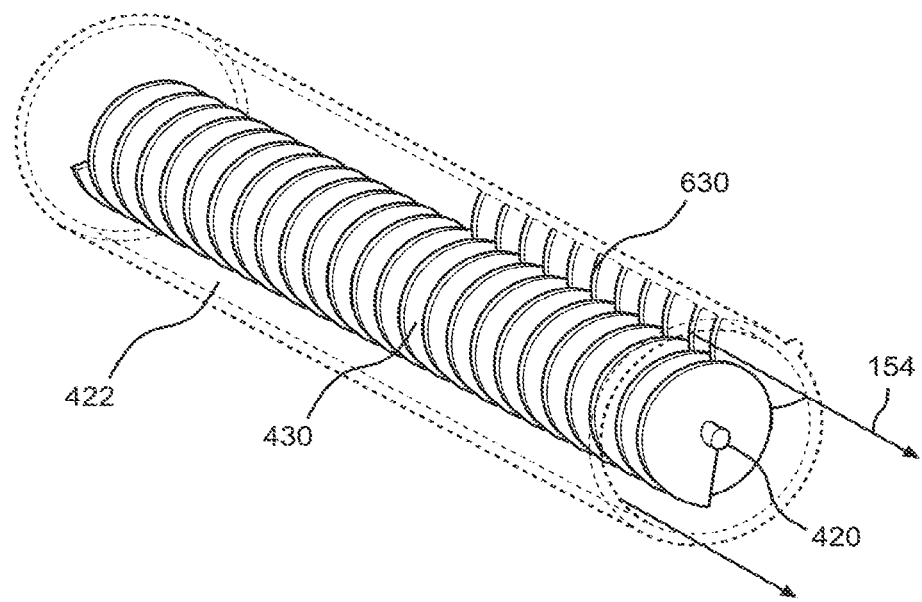
FIG. 6B illustrates a frontal top perspective view of the interior of an additional example progressive hydration system according to one embodiment of the present disclosure.

FIG. 6B illustrates a frontal top perspective view of a cross section of an additional example progressive hydration system according to another embodiment of the present disclosure. The system as shown in FIG. 4A is largely present in this example, including an infeed, not pictured, which provides material (e.g., protein or starch); an inner shaft 420 which rotates; an exterior tube 422 which contains material; and a mixing and conveying auger 430 which rotates and pushes the material forward. In place of the shear crushing spheroids of FIG. 4A, a different shear crushing component is included in the form of a partial shearing auger 630. In varying embodiments, a partial shearing auger may be, e.g., a portion of a shearing auger or a partial section of shearing auger flutes, as illustrated in the figure. The shearing auger 630 is mounted within exterior tube 422, such that the flutes of the shearing auger 630 protrude into the spaces between the flutes of the mixing and conveying auger 430. In varying embodiments, the partial shearing auger 630 can rotate either with or in opposite motion to the inner shaft 420. In some embodiments, the exterior tube 422 rotates such that the shearing auger 630 progresses around the mixing and conveying auger 430 in a planetary fashion. As the material is pushed along by the rotating auger 430, the shearing auger 630 functions by providing a surface for shearing and crushing the material between the flutes of the mixing and conveying auger 430 and the flutes of the shearing auger 630. In some embodiments, the partial shearing auger 630 contains flutes which do not complete a full circle of rotation, as illustrated in FIG. 6B. In other embodiments, the shearing auger 630 includes flutes which trace out a full circle of rotation.

In some embodiments, some or all of the components of FIG. 6B are modular in nature to allow removing the components for disassembly and cleaning in an industrial dishwasher or other cleaning device, or to facilitate clean-in-place. For example, in some embodiments, all or a portion of the auger 430 and/or the partial shearing auger 630 may be removed. In some embodiments, the auger flutes of the auger 430 and/or the auger flutes of the partial shearing auger 630 may be removed. In some embodiments, all of the auger flutes and any other elements of the partial shearing auger 630 portion of the inner shaft and exterior tube may be removed. In some embodiments, the modularity may enable a different design, such as, for example, a tube containing intermittent sections of shearing auger flutes, of equal or differing lengths, spaced at even or uneven intervals; or any other suitable combination which may perform alternate methods of hydrating and/or shearing the material.

In some embodiments, the shearing auger action shown in the embodiment of FIG. 6B may be accomplished by stationary protrusions from the exterior tube 422, instead of by the flutes of partial shearing auger 630. In such an embodiment, the material is sheared between the flutes of the mixing/conveying auger 430 and the stationary protrusions.

In some embodiments, the shearing auger action shown in the various embodiments of FIG. 6A and FIG. 6B may be accomplished by a worm gear system, such that the mixing/conveying auger 430 functions as the worm gear, and the shearing action is accomplished through the coupled rotation of a spur gear oriented orthogonally to the flutes of the auger 430.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A system configured to hydrate and process foodstuff materials, the system comprising:
   an exterior tube having a foodstuff inlet and an outlet, the exterior tube defining a longitudinal axis, wherein the exterior tube is configured to facilitate the conveyance of foodstuff materials along a material passage from the foodstuff inlet to the outlet;
   an inner shaft located within the exterior tube and extending along the longitudinal axis, the inner shaft combining with the exterior tube to define the material passage, wherein the inner shaft is configured to be rotationally driven and includes one or more particle resizing features extending therefrom; and
   multiple water inlets spaced apart along the length of the material passage, wherein the multiple water inlets are configured to provide water to the foodstuff materials at different locations along the length of the material passage as the foodstuff materials are being conveyed along the material passage.

2. The system of claim 1, wherein the one or more particle resizing features are configured to reduce the foodstuff materials into a plurality of smaller foodstuff material particles when the foodstuff materials are within the material passage and the inner shaft is rotationally driven.

3. The system of claim 2, wherein the one or more particle resizing features are configured to reduce the foodstuff materials into a plurality of smaller foodstuff material particles at multiple locations between different water inlets.

4. The system of claim 1, wherein rotationally driving the inner shaft results in both conveying the foodstuff materials along the material passage and reducing the foodstuff materials into a plurality of smaller foodstuff material particles via the one or more particle resizing features.

5. The system of claim 1, wherein the multiple water inlets include openings in the exterior tube.

6. The system of claim 1, wherein the system includes a hydrating section followed by a section with particle resizing features followed by another hydrating section.

7. The system of claim 1, wherein the one or more particle resizing features are interchangeable with respect to the inner shaft.

8. The system of claim 1, wherein the exterior tube is configured to be readily detached from the inner shaft.

9. The system of claim 1, wherein the multiple water inlets are configured to facilitate the continuous and progressive hydration of the foodstuff materials along the length of the material passage.

10. The system of claim 1, wherein the foodstuff materials include one or more meat analogue products.

11. A progressive hydration system, comprising:
    an exterior member having a material inlet and an outlet, wherein the exterior member is configured to facilitate the conveyance of material along a material passage within the exterior member from the material inlet to the outlet;
    one or more material processing components located along the material passage within the exterior member, wherein the one or more material processing components are configured to transform the material as the material is conveyed along the material passage; and
    multiple water inlets spaced apart along the length of the material passage, wherein the multiple water inlets are configured to provide water to the material at different locations along the length of the material passage as the material is conveyed along the material passage.

12. The progressive hydration system of claim 11, wherein the one or more material processing components are configured to transform the material at multiple locations between different water inlets.

13. The progressive hydration system of claim 11, wherein the multiple water inlets are configured to facilitate the continuous and progressive hydration of the material along the length of the material passage.

14. A method of hydrating and processing foodstuff materials, the method comprising:
    conveying foodstuff materials through a material passage located between an exterior tube and an inner shaft of a foodstuff hydration and processing system, wherein the inner shaft includes one or more particle resizing features extending therefrom;
    reducing the foodstuff materials into a plurality of smaller foodstuff material particles via the one or more particle resizing features while conveying the foodstuff materials through the material passage; and
    providing water to the foodstuff materials via multiple water inlets spaced apart along the length of the material passage while conveying the foodstuff materials through the material passage.

15. The method of claim 14, wherein reducing the foodstuff materials into a plurality of smaller foodstuff material particles occurs at multiple locations between water inlets along the length of the material passage.

16. The method of claim 14, wherein providing water to the foodstuff materials includes hydrating newly exposed surface areas of the smaller foodstuff material particles due to reducing the foodstuff materials.

17. The method of claim 14, wherein the smaller foodstuff material particles are of uniform or nearly uniform particle size.

18. The method of claim 14, wherein the conveying foodstuff materials and the reducing the foodstuff materials into a plurality of smaller foodstuff material particles are both facilitated by rotating the inner shaft.

19. The method of claim 14, wherein providing water to the foodstuff materials includes providing water after an initial reduction of the foodstuff materials into a plurality of smaller foodstuff material particles and then providing more water after a further reduction of the foodstuff materials into a plurality of smaller foodstuff material particles.

20. The method of claim 14, further comprising:
    providing the foodstuff materials through a foodstuff inlet into the material passage; and
    collecting the foodstuff materials from an outlet of the exterior tube after the foodstuff materials have been conveyed through the material passage.

* * * * *